(12) United States Patent
Wang et al.

(10) Patent No.: US 6,730,757 B2
(45) Date of Patent: May 4, 2004

(54) SULFUR-CONTAINING AND SULFUR-NITROGEN-CONTAINING CATALYSTS FOR POLYMERIZATION OF OLEFINS AND POLAR MONOMERS

(75) Inventors: Kun Wang, Bridgewater, NJ (US); Abhimanyu Onkar Patil, Westfield, NJ (US); Stephen Zushma, Clinton, NJ (US); Ernestine Williams Hill, Piscataway, NJ (US); Edward Ira Stiefel, Bridgewater, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/093,601

(22) Filed: Mar. 8, 2002

(65) Prior Publication Data

US 2003/0171209 A1 Sep. 11, 2003

(51) Int. Cl.$^7$ .............................. C08F 4/70; C08F 4/60

(52) U.S. Cl. .................... 526/161; 526/160; 526/169.1; 526/171; 526/172; 526/328; 526/329; 502/117; 502/155; 502/167; 502/168

(58) Field of Search ................................. 526/161, 172; 502/117, 155, 168

(56) References Cited

U.S. PATENT DOCUMENTS

| 5,198,401 A | 3/1993 | Turner et al. ................ 502/155 |
| 6,037,297 A | 3/2000 | Stibrany et al. ............. 502/155 |
| 6,120,692 A | 9/2000 | Wang et al. ................. 210/749 |
| 6,511,934 B1 * | 1/2003 | Cook et al. .................. 502/104 |

FOREIGN PATENT DOCUMENTS

| JP | 99171915 | 6/1999 | ............. C08F/4/50 |
| JP | 0181119 | 3/2001 | ............. C08F/4/50 |
| WO | WO 97/48736 | 12/1997 | ............. C08F/4/80 |
| WO | WO 98/35996 | 8/1998 | ............. C08F/4/10 |
| WO | WO 99/30822 | 6/1999 | ............. B01J/31/00 |

OTHER PUBLICATIONS

J. Van Rijn, et al., "Coordination Compounds with a Biomimetic N$_2$S$_2$ Ligand, Resulting in Long Metal–Thioether Bonds", Polyhedron, vol. 8, No. 15, pp. 1965–1970, 1989.
E. Bouwman, et al., "The Synthesis and Characterization of Some New Thioether–Imidazole Containing Ligands", Synthetic Communications, vol. 18, pp. 1581–1588, 1988.
J. Van Rijn, et al., "Synthesis, Spectroscopic Properties, and X–ray Structure of [1,7–Bis(5–methylimidazol–4–yl)–2, 6–dithiaheptane]dichlorocopper(II): A Compound with Unusually Long Cooper(II)–Thioether Bonds", Inorganic Chemistry, vol. 23, No. 22, pp. 3584–3588, 1984.

H.J.A. Blaauw, et al., "Syntheses and Properties of Dihalogold(III) N,N–Dialkyldithiocarbamates and Dialkylgold(III) n,N–dialkyldithiocarbamates", Journal of Organometallic Chemistry, Vol 2, pp. 236–244, 1964.
J.C. Randall, et al., "Carbon–13 NMR Characterization of Ethylene–Acrylonitrile Copolymers Prepared by High–Pressure Free–Radical Polymerizations", Macromolecules, vol. 25, pp. 2624–2633, 1992.
E.F. McCord, et al., "Short–Chain Branching Structures in Ethylene Copolymers Prepared by High–Pressure Free–Radical Polymerization: An NMR Analysis", Macromolecules, vol. 30, pp. 246–256, 1997.
J.C. Randall, "A Review of High Resolution Lipid $^{13}$Carbon Nuclear Magnetic Resonance Characterizations of Ethylene Based Polymers", Macromolecules, vol. C29, pp. 201–317, 1989.
S.H. Strauss, "The Search for Larger and More Weakly Coordinating Anions", Chemical Review, vol. 93, pp. 927–942, 1993.
X. Yang, et al., "Cation–like Homogeneous Olefin Polymerization Catalysts Based Upon Zirconocene Alkyls and Tris(pentafluorophenyl)borane", Journal of the American Chemical Society, vol. 113, pp. 3623–3625, 1991.
M. Nishimura, et al., "Living Radical Polymerization of Styrene with Transition Metal Dithiocarbamate/AIBN Systems: Halogen–Free Living Processes", Polymr Prepr., vol. 40, pp. 470–471, 1999.
G.J.P. Britovsek, et al., "The Search for New–Generation Olefin Polymerization Catalysts: Life Beyond Metallocenes", Agnew. Chem. Int. Ed., vol. 38, pp. 428–447, 1999.
S.D. Ittel, et al., "Late–Metal Catalysts for Ethylene Homo– and Copolymerization", Chem. Rev., vol. 1000, pp. 1169–1203, 2000.
M.D. Bruch, et al., "Assignment of Monomer Sequences in the $^{13}$C and $^1$H NMR Spectra of Several Ethylene–Containing Co– and Terpolymers by Two–Dimensional Nuclear Magnetic Resonance Spectroscopy", Macromolecules, vol. 19, pp. 2712–2721, 1986.

(List continued on next page.)

Primary Examiner—Roberto Rabago
(74) Attorney, Agent, or Firm—Joseph C. Wang

(57) ABSTRACT

The inventions disclosed herein are catalyst systems comprising a complex having one of the formulas LMX$_1$X$_2$ and LML' and an activating cocatalyst, and use of the catalyst system in polymerizing olefinic monomers. In either of the foregoing formulas, L is a chelating ligand containing sulfur donors; M is a transition metal selected from either copper, silver, gold, manganese, iron, cobalt, palladium or nickel; X$_1$ and X$_2$ are independently selected from either halides, hydride, triflate, acetate, borate, alkyl, alkoxyl, cycloalkyl, cycloalkoxyl, aryl, thiolate, carbon monoxide, cyanate or olefins; and L' is a bidentate ligand selected from either dithiolene, dithiolate, diphosphine, bisimine, bispyridine, phenanthroline, oxolate, catecholate, thiolatoamide, thiolatoimine or thiolatophosphine.

37 Claims, No Drawings

OTHER PUBLICATIONS

S. Akerstrom, "The Cuprous Salts of N,N–disubstituted dithiocarbamic Acids and Their Degree of Polymerization", *Acta Chem. Scand*, vol. 10, pp. 699–701, 1956.

S. Akerstrom, "The Cuprous Salts of N,N–disubstituted dithiocarbamic Acids and Their Degree of Polymerization", *Acta Chem. Scand*, vol. 10, pp. 699–701, 1956.

* cited by examiner

SULFUR-CONTAINING AND SULFUR-NITROGEN-CONTAINING CATALYSTS FOR POLYMERIZATION OF OLEFINS AND POLAR MONOMERS

BACKGROUND OF THE INVENTION

1. Field of the Invention

The invention is directed towards late transition metal polymerization catalysts and their use in forming homopolymers from olefins or polar monomers and forming copolymers from olefins and polar monomers. In particular, the present invention relates to sulfur-containing and sulfur-nitrogen containing catalysts for the polymerization of olefins and polar monomers.

2. Description of the Related Art

Despite the technological and commercial success of Group 4 Ziegler-Natta and metallocene catalysts for polyolefins, the search for new catalysts and polymerization reactions continues. There is a drive to obtain even greater control over product properties and to extend the family of products to new monomer combinations. Catalysts that tolerate a variety of functional groups are of particular interest because they not only open up new product possibilities, but also allow for the use of cheaper, less pure monomer feeds. Late transition metal complexes are generally more tolerant of polar groups than those of early transition metals.

Late transition metal polyolefin catalysts have recently been reviewed (G. J. P. Britovsek, et al., *Chem. Int. Ed.*, 1999, 38, 428; S. D. Ittel, et al., *Chem. Rev.*, 2000, 100, 1169). To date, there are only a few examples of catalysts based on Group 11 metals (Cu, Au, Ag), which appeared only very recently in the literature. For example, Stibrany, et al. (PCT Pat. No. WO 99/30822) has disclosed $LMX_1X_2$ complexes, wherein M is Cu, Ag or Au, and L is a bidentate ligand, such as bis-benzimidazole, with activating cocatalysts for the homopolymerization and copolymerization of certain olefin and polar monomers. Copolymers of ethylene and certain polar monomers (e.g., alkyl acrylates, vinyl ethers) have been claimed. In PCT Pat. No. WO 98/35996 and Japanese Pat. No. 99171915, polymerization methods using $CuX_n$, $LCuX_n$, or $L(L')CuX_n$ catalysts with and without activating cocatalysts have been claimed. Specifically, these disclosures relate to Cu(II) amidinates, quinolates and acetoacetonates with MAO and other activators.

The rich coordination and redox chemistry of transition metal complexes with sulfur ligands provides a unique opportunity in the area of olefin oligomerization and polymerization. Metal complexes of sulfur-nitrogen chelating ligands have attracted considerable attention because of their interesting physicochemical properties and structural similarity to metalloprotein and metalloenzyme active sites. For example, it is known that histidine imidazole nitrogen atoms and methionine thioether sulfur atoms play key roles in the coordination of metals at the active sites of numerous metallo-biomolecules. Non-cyclic tetradentate chelating ligands with an NSSN-donor system are most utilized as models for such systems. An example for this type of ligand is the biomimetic $N_2S_2$ ligand, 1,7-bis(5-methyl-4-imidazolyl)-2,6-dithiaheptane (bidhp), which forms complexes like $M(bidhp)X_2$, where M is Mn, Ni or Cu, and X is Br, Cl or NCS. In these complexes, the metal ions are hexacoordinated by two anions and the tetradentate ligand. The structures have distorted octahedral coordination.

Despite this broad range of activity on sulfur-containing complexes, those being reported as oligomerization and polymerization catalysts are extremely rare. The only known sulfur-containing polymerization systems based on a group 11 metal (Cu) have been disclosed by Hiraike, et al. (Japanese Pat. No. 200108119) and by Nishimura, et al. (*Polym. Prepr.*, 1999, 40, 470), and both systems are free radical processes. In Japanese Pat. No. 200108119 to Hiraike, et al., radical polymerization of vinylic monomers using Cu(II)-thioether dihalide catalysts is disclosed. However, whether this system can polymerize olefins, such as ethylene, and copolymerize olefin and polar monomers are not mentioned. Living radical polymerization of styrene with a Cu bis(dithiocarbamate)/AIBN system have been disclosed by Nishimura, et al. (*Polym. Prepr.*, 1999, 40, 470). It is not disclosed whether the system can polymerize olefins, such as ethylene, or whether it can tolerate polar monomers. Obviously, these systems fall in the category of free radical-initiated polymerization; and it is not clear whether they can polymerize or copolymerize olefins, such as ethylene and polar monomers.

Consequently, there remains a need for polymerization catalysts capable of forming olefinic polymers and copolymers and that are effective polymerization catalysts in the presence of polar monomers. Further, it is even more desirable to have a catalyst that can copolymerize olefin and polar monomers, forming functional copolymers.

It has been demonstrated by Wang, et al. (U.S. Pat. No. 6,120,692) that, under certain conditions, sulfur-containing complexes can tolerate contaminants (catalyst poisons), like $H_2S$, $H_2O$, $C_2H_2$, CO and $H_2$. Therefore, another potential advantage of sulfur-containing polymerization catalysts is their resistance to poisons, which may potentially allow for the use of impure feeds.

SUMMARY OF THE INVENTION

It is one object of this invention to teach a catalyst system made from the combination of a complex having a formula selected from $LMX_1X_2$ or LML' and an activating cocatalyst. In either formula, L is a chelating ligand containing sulfur donors; M is a transition metal selected from either copper, silver, gold, manganese, iron, cobalt, palladium or nickel; $X_1$ and $X_2$ are independently selected from either halides, hydride, triflate, acetate, borate, alkyl, alkoxyl, cycloalkyl, cycloalkoxyl, aryl, thiolate, carbon monoxide, cyanate or olefins; and L' is a bidentate ligand selected from either dithiolene, dithiolate, diphosphine, bisimine, bispyridine, phenanthroline, oxolate, catecholate, thiolatoamide, thiolatoimine or thiolatophosphine. It is most preferred that L' is a dithiolene having the formula $S_2C_2(CN)_2$.

In one embodiment, L has the formula $R_nZCS_2$, wherein R is either hydrogen, alkyl, substituted alkyl, alkenyl, substituted alkenyl, aryl, substituted aryl, alkoxyl, substituted alkoxyl, cycloalkyl, substituted cycloalkyl, amino or substituted amino groups; n=1 or 2; and Z is nitrogen or oxygen. If Z is oxygen, then n=1. Alternatively, if Z is nitrogen, then n=2; in this case, the preferred ligand L is $^iBu_2NCS_2$.

In another embodiment, L is a bisimidazolyl dithioalkane ligand having the structure:

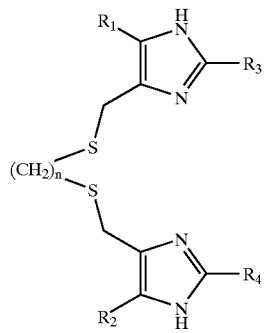

In the structure shown above, $R_1$, $R_2$, $R_3$ and $R_4$ are independently selected from either hydrogen, alkyl, substituted alkyl, alkenyl, substituted alkenyl, aryl, substituted aryl, alkoxyl, substituted alkoxyl, cycloalkyl, substituted cycloalkyl, amino or substituted amino groups; and n=1 to 6. It is most preferred that L be either 1,7-bis(5-methyl-4-imidazolyl)-2,6-dithioheptane (bidhp) or 1,6-bis(5-methyl-4-imidazolyl)-2,5-dithiohexane (bidhx).

In a preferred embodiment, when $X_1=X_2$, each of $X_1$ and $X_2$ can be either bromine or chlorine.

Among the cocatalysts that may be used in the instant catalyst system, the preferred ones are alkylaluminoxanes, aluminum alkyls, aluminum halides, alkyl aluminum halides, Lewis acids other than any of the foregoing, alkylating agents and mixtures thereof. The most preferred cocatalyst is methylaluminoxane.

A further object of the present invention is to demonstrate that the sulfur/sulfur-nitrogen catalyst system taught herein may be successfully utilized to polymerize olefinic monomers under polymerization conditions. Preferred olefinic monomers are: acyclic aliphatic olefins; olefins having a hydrocarbyl polar functionality; and mixtures of at least one olefin having a hydrocarbyl polar functionality and at least one acyclic aliphatic olefin. For example, in addition to ethylene and acrylates, other monomers such as vinyl acetate, a-olefins, styrene and butadiene can also be polymerized.

It is believed that, under certain conditions, these systems can tolerate contaminants (i.e., are poison resistant), like $H_2S$, $H_2O$, $C_2H_2$, CO and $H_2$. Hence, they can potentially allow for the use of impure feeds.

These sulfur-containing and sulfur/nitrogen-containing catalyst systems can be supported and used for gas-phase polymerization. Preferred supports include alumina, silica, mesoporous materials like MCM-41, and cross-linked polymers.

DETAILED DESCRIPTION OF THE INVENTION

The catalyst system of this invention is the combination of a complex having the formula $LMX_1X_2$ or LML' and an activating cocatalyst. In either of the catalyst formulas, L is a chelating ligand containing sulfur donors. In one embodiment, L has the formula $R_nZCS_2$, wherein R is either hydrogen, alkyl, substituted alkyl, alkenyl, substituted alkenyl, aryl, substituted aryl, alkoxyl, substituted alkoxyl, cycloalkyl, substituted cycloalkyl, amino or substituted amino groups; n=1 or 2; and Z is nitrogen or oxygen. In particular, if Z is oxygen, then n=1. But, if Z is nitrogen, then n=2. In this embodiment, when n=2 and Z is nitrogen, the most preferred ligand L is $^iBu_2NCS_2$, wherein $^iBu$ or i-Bu represents isobutyl.

In another embodiment, L is a bisimidazolyl dithioalkane ligand having the following structure:

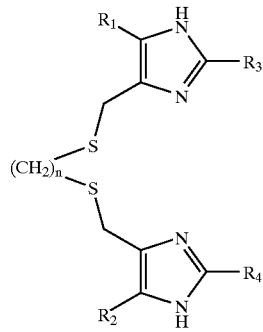

In this structure, $R_1$, $R_2$, $R_3$ and $R_4$ are independently selected from either hydrogen, alkyl, substituted alkyl, alkenyl, substituted alkenyl, aryl, substituted aryl, alkoxyl, substituted alkoxyl, cycloalkyl, substituted cycloalkyl, amino or substituted amino groups; and n=1 to 6. It is most preferred in this embodiment that L is either 1,7-bis(5-methyl-4-imidazolyl)-2,6-dithioheptane (bidhp) or 1,6-bis (5-methyl-4-imidazolyl)-2,5-dithiohexane (bidhx).

In further describing the formulas $LMX_1X_2$ and LML', M is a transition metal selected from either copper, silver, gold, manganese, iron, cobalt, palladium or nickel. M is most preferably copper, gold or silver.

$X_1$ and $X_2$ are independently selected from either halides, hydride, triflate, acetate, borate, alkyl, alkoxyl, cycloalkyl, cycloalkoxyl, aryl, thiolate, carbon monoxide, cyanate or olefins. Preferably, $X_1$ and $X_2$ are independently selected from either C1 through C12 alkyl, C1 through C12 alkoxyl, C3 through C12 cycloalkyl, and C3 through C12 cycloalkoxyl. In a preferred embodiment $X_1$ is the same as $X_2$, in which case each of $X_1$ and $X_2$ is either bromine or chlorine.

Continuing to describe the alternative formulas, L' is a bidentate ligand selected from either dithiolene, dithiolate, disphosphine, bisimine, bispyridine, phenanthroline, oxolate, catecholate, thiolatoamide, thiolatoimine or thiolatophosphine. The most preferred bidentate ligand L' is a dithiolene having the formula $S_2C_2(CN)_2$.

Sample structures of catalysts having either formula $LMX_1X_2$ or LML' are:

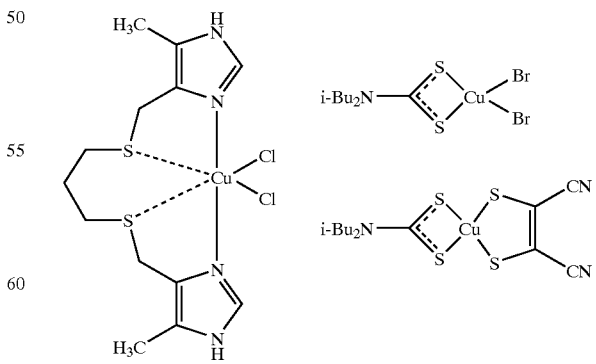

According to the present invention, a complex having the formula $LMX_1X_2$ or LML', wherein L, M, $X_1$, $X_2$ and L' are as previously defined, is combined with an activating cocatalyst. Examples of such cocatalysts include aluminum compounds containing an Al—O bond, such as the alkylaluminoxanes, including methylaluminoxane ("MAO") and isobutyl modified methylaluminoxane; aluminum alkyls; aluminum halides; alkyl aluminum halides; Lewis acids other than any of the foregoing list; and mixtures of the foregoing can also be used in conjunction with alkylating agents, such as methyl magnesium chloride and methyl lithium. Examples of such Lewis acids are those compounds corresponding to the formula: $R''''_3 B$, wherein $R''''$ independently each occurrence is selected from hydrogen, silyl, hydrocarbyl, halohydrocarbyl, alkoxide, aryloxide, amide or combinations thereof, said $R''''$ having up to 30 non-hydrogen atoms; and B is boron.

It is to be appreciated by those skilled in the art that the above formula for the preferred Lewis acids represents an empirical formula, and that many Lewis acids exist as dimers or higher oligomers in solution or in the solid state. Other Lewis acids which are useful in the catalyst compositions of this invention will be apparent to those skilled in the art.

Other examples of cocatalysts include salts of group 13 element complexes. These and other examples of suitable cocatalysts and their use in organometallic polymerization are discussed in U.S. Pat. No. 5,198,401 and PCT patent documents PCT/US97/10418 and PCT/US96/09764, all incorporated by reference herein. Preferred activating cocatalysts include trimethylaluminum, triisobutylaluminum, methylaluminoxane, ethylaluminoxane, chlorodiethyaluminum, dichloroethylaluminum, triethylboron, trimethylboron, triphenylboron and halogenated, especially fluorinated, triphenyl boron compounds.

Most highly preferred activating cocatalysts include triethylaluminum, methylaluminoxane, and fluoro-substituted triaryl borons, such as tris(4-fluorophenyl)boron, tris(2,4-difluorophenylboron), tris(3,5-bis (trifluoromethylphenyl) boron, tris(pentafluorophenyl) boron, pentafluorophenyl-diphenyl boron, and bis (pentafluorophenyl) phenylboron. Such fluoro-substituted triarylboranes may be readily synthesized according to techniques such as those disclosed in Marks, et al., J. Am. Chem. Soc., 113, 3623–25 (1991).

The catalyst system can be utilized by forming the metal complex $LMX_1X_2$ or $LML'$ and, where required, combining the activating cocatalyst with the same in a diluent. The preparation may be conducted in the presence of one or more additional polymerizable monomers, if desired. Preferably, the catalysts are prepared at a temperature within the range from –100° C. to 300° C., preferably 0° C. to 250° C., and most preferably 0° C. to 100° C.

Suitable solvents include liquid or supercritical media, such as $CO_2$, propane, butane, saturated and unsaturated hydrocarbons, $N_2$ and $NH_3$; straight- and branched-chain hydrocarbons, such as isobutane, butane, pentane, hexane, heptane, octane and mixtures thereof; cyclic hydrocarbons, such as cyclohexane, cycloheptane, methylcyclohexane and methylcycloheptane; halogenated hydrocarbons, such as chlorobenzene, dichlorobenzene and perfluorinated $C_{4-10}$ alkanes; and aromatic and alkyl-substituted aromatic compounds, such as benzene, toluene and xylene. Suitable solvents also include liquid olefins that may act as monomers or comonomers, including ethylene, propylene, butadiene, cyclopentene, 1-hexene, 3-methyl-1-pentene, 4-methyl-1-pentene, 1-octene, 1-decene and 4-vinycylohexane (including all isomers alone or in mixtures). Other solvents include anisole, methylchloride, methylene chloride, 2-pyrrolidone and N-methylpyrrolidone. Preferred solvents are aliphatic hydrocarbons and aromatic hydrocarbon, such as toluene.

In the practice of this invention, it is believed that the cocatalyst interacts with the metal complex to create a polymerization-active metal site in combination with a suitable non-coordinating anion. Such an anion is a poor nucleophile, has a large size (about 4 Angstroms or more), a negative charge that is delocalized over the framework of the anion, and is not a strong reducing or oxidizing agent (S. H. Strauss, Chem. Rev., 93, 927 (1993)). When the anion is functioning as a suitable non-coordinating anion in the catalyst system, the anion does not transfer an anionic substituent or fragment thereof to any cationic species formed as the result of the reaction.

The equivalent ratio of metal complex to activating cocatalyst is preferably in a range from $1:10^{-2}$ to $1:10^6$, more preferably from 1:0.5 to $1:10^4$, and most preferably from 1:0.75 to $1:10^3$. In most polymerization reactions, the equivalent ratio of catalyst:polymerizable compound employed is from $10^{-12}:1$ to $10^{-1}:1$, and more preferably from $10^{-9}:1$ to $10^{-4}:1$.

Advantageously, it is believed that the catalyst system of the present invention is not poisoned by compounds containing contaminants when used in the preparation of polymers and copolymers synthesized from olefinic monomers and polar monomers. Such contaminants include $H_2S$, $H_2O$, $C_2H_2$, CO and $H_2$, among others. The result is that impure, cheaper feeds can be used to form polymers and copolymers.

The feeds used in the polymerization and copolymerization reactions disclosed herein typically are made up of olefinic monomers, polar monomers and mixtures thereof. Preferred olefinic monomers are acyclic aliphatic olefins, the most preferred of which is ethylene. Preferred polar monomers are n-butyl acrylate and t-butyl acrylate.

Olefinic monomers useful in forming homo- and copolymers with the catalyst of the invention include, for example, mono-olefins, non-conjugated dienes and oligomers, and higher molecular weight, vinyl-terminated macromers. Examples include $C_{2-20}$ olefins, vinylcyclohexane, tetrafluoroethylene, and mixtures thereof. Preferred monomers include the $C_{2-10}$ α-olefins, especially ethylene, propylene, isobutylene, 1-butene, 1-hexene, 4-methyl-1-pentene and 1-octene or mixtures of the same.

Monomers having hydrocarbyl polar functionalities useful in forming homo- and copolymers with the catalyst of the invention are vinyl ether and $C_1$ to $C_{20}$ alkyl vinyl ethers, such as n-butyl vinyl ether; alkyl acrylates, such as $C_1$ to $C_{24}$ acrylates, especially t-butyl acrylate, and lauryl acrylate; and methacrylates, such as methyl methacrylate.

Other polar monomers that can be useful in the invention include vinyl acetate, vinyl pivalate, vinyl propionate, vinyl benzoate, vinyl chloride, acrylonitrile, acrylamide, isobutyl vinyl ether, methyl vinyl ketone, 1-vinyl-2-pyrrolidone, diethyl fumarate, acrylic acid, methacrylic acid, 5-norbornene-2-carboxylic acid, 5-norbornene-2-methanol, 3-vinylbenzoic acid, 2-acetyl-5-norbornene, 2-vinyl-1,3-dioxolane, 4-vinyl aniline, 4-vinylanisole, 4-acetoxystyrene, 4-vinylpyridine, 2-vinylpyridine, vinylcyclohexylamines, 1-vinylimidazole, N-vinylcaprolactone, 9-vinylcarbazole and vinyl acetic acid.

In general, the polymerization may be accomplished at conditions well known in the art for Ziegler-Natta or Kaminsky-Sinn type polymerization reactions, that is, temperatures from –100° C. to 250° C., preferably from 0° C. to 250° C., and pressures from atmospheric to 210 MPa (30,000 psig). Suitable polymerization conditions include those known to be useful for metallocene catalysts when activated by aluminum or boron-activated compounds. Suspension, solution, slurry, gas phase or other process conditions may be employed, if desired. The catalyst may be supported and such supported catalyst may be employed in the polymerizations of this invention. Preferred supports include alumina, silica, mesoporous materials, such as MCM-41, and polymeric supports, such as cross-linked polymers.

The polymerization typically will be conducted in the presence of a solvent. Suitable solvents include those previously described as useful in the preparation of the catalyst. Indeed, the polymerization may be conducted in the same solvent used in preparing the catalyst. Optionally, of course, the catalyst may be separately prepared in one solvent and used in another.

The polymerization will be conducted for a time sufficient to form the polymer, and the polymer is recovered by techniques well known in the art and illustrated in the examples hereinafter.

An important feature of the invention is the formation of substantially linear copolymers having the formula:

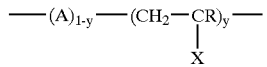

where A is a segment derived from an acyclic aliphatic olefin of 2 to about 20 carbon atoms; R is H or $CH_3$; X is $^-OR^1$ or $^-COOR^1$, wherein $R^1$ is an alkyl group of 1 to 24 carbon atoms; and y is from about 0.02 to about 0.95, and preferably y is from about 0.18 to about 0.85. The polar content of the copolymer can be varied by reaction conditions as demonstrated in Examples 4 and 5.

These copolymers have polar functional monomer segments:

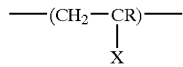

which are substantially in the chain, rather than at the ends of branches.

In the case where —A— is a polymer segment derived from ethylene, the branch content is below about 20 branches/1000 carbon atoms, for example from about 0.5 to less than 20 branches.

The invention is further described in the following non-limiting examples.

EXAMPLES

Example 1
Preparation of ($^i$Bu$_2$NCS$_2$)CuBr$_2$

The oligomeric species [Cu(S$_2$NC$^i$Bu$_2$)]$_n$ was prepared following the literature method by stirring N,N-di-isobutyl thiuram disulfide with an excess of copper powder in $CS_2$ at room temperature (Akerstrom, *Acta Chem. Scan.*, 1956, 10, 699–701). A solution of 1.07 g (6.72 mmol) of $Br_2$ in 10.7 mL Of $CS_2$ was added drop-wise under $N_2$ to a flask containing a stirred solution of [Cu(S$_2$NC$^i$Bu$_2$)]$_n$ (1.8 g, 6.72 mmol) in 72 mL of $CS_2$. The solution turned blue-green and solids began forming during bromine addition. The suspension was stirred for 2 hours and an equal volume of diethylether was added. The mixture was cooled at $-20°$ C. for 3 hours. The resulting crystals were filtered and re-crystallized from $CH_2Cl_2/Et_2O$ to yield dark purple, needle-shaped crystals (yield 2.2 g, 76%). $^1$H NMR (CDCl$_3$, 400 MHz): δ (ppm) 0.97 (d, $J_{H-H}$=6.6 Hz, 12H), 2.17 (m, 2H), 3.38 (d, $J_{H-H}$=7.5 Hz, 4H). Elemental analysis (ICP) shows: Cu, 14.7% (found), 14.86% (calculated).

Example 2
Polymerization of Ethylene Using ($^i$Bu$_2$NCS$_2$)CuBr$_2$ of Example 1

A glass-lined Parr reactor was loaded in an argon glove-box with 100 mL of toluene, 9 g (0.0465 mol, Al/Cu=1000) of 30% MAO solution in toluene and 0.02 g (FW 428, 0.417 mmol) of ($^i$Bu$_2$NCS$_2$)CuBr$_2$, the compound formed in Example 1. The Parr reactor was then sealed, placed in a fume hood and pressurized with 5 MPa (700 psig) ethylene and stirred at 60° C. for 18 hours. The reactor was cooled, vented and its contents poured into a solution of MeOH/HCl (300 mL MeOH/100 mL 10% HCl). The mixture was stirred for 24 hours to remove catalyst residues. The polymer was isolated by filtration and dried under vacuum at 60° C. for 24 hours. The yield of the polyethylene was 20 mg. $^{13}$C NMR (TCE, Cr(AcAc)$_3$, δ29.5 (s, —CH$_2$—). There were no detectable resonances for branching elsewhere in the spectrum (branch content <0.5 branches/1000 carbon atoms), using the method of Randall (*J. Macromol. Sci., Rev. Macromol. Chem. Phys.*, 1989, C29, 292). The IR spectrum (film) of the product showed the characteristic linear crystalline polyethylene doublet absorption at 719 and 729 cm$^{-1}$.

Example 3
Polymerization of n-butyl Acrylate Using ($^i$Bu$_2$NCS)CuBr$_2$ of Example 1

In an argon glove-box, a 30 mL septum bottle was loaded with 0.0139 g (FW 428, 0.0324 mmol) of ($^i$Bu$_2$NCS$_2$)CuBr$_2$ and 15 mL of toluene. An amount of 0.77 g (0.004 mol, Al/Cu=123) of 30% MAO solution in toluene was then added. Then, 5 g (FW 128.17, 0.039 mol) of n-butyl acrylate was added. The bottle was sealed in the glove box and brought into the fume hood. The solution was stirred at 25° C. for 24 hours. The viscous solution was poured into methanol/10% HCl (300:100) solution to precipitate the polymer. The product was washed with water, then methanol and dried in vacuum oven at 60° C. for 24 hours. The yield of the poly(n-butyl acrylate) was 0.090 g (1.8%). $^{13}$C NMR (ppm), TCE, Cr(AcAc)$_3$:13.7 [s, —CH$_2$—CH(COOCH$_2$CH$_2$CH$_2$CH$_3$)—], 19.1 [s, —CH$_2$—CH (COOCH$_2$CH$_2$CH$_2$CH$_3$)—], 30.7 [s, —CH$_2$—CH(COOCH$_2$CH$_2$CH$_2$CH$_3$)—], 34–37 [m, —CH$_2$CH(COOCH$_2$CH$_2$ CH$_2$CH$_3$)—], 41–42 [m, —CH$_2$—CH(COOCH$_2$CH$_2$CH$_2$CH$_3$)—], 64.5 [s, —CH$_2$—CH(COOCH$_2$CH$_2$CH$_2$CH$_3$)—], 174–175 [m, —CH$_2$——CH(COOCH$_2$CH$_2$CH$_2$CH$_3$)—]. There were no resonances due to unreacted (unpolymerized) olefin from the monomer.

Example 4
Copolymerization of Ethylene and t-butyl Acrylate Using ($^i$Bu$_2$NCS$_2$)CuBr$_2$ of Example 1

A glass-lined Parr reactor was loaded in an argon glove-box with 100 mL of toluene, 1.0301 g (5.32 mmol, Al/Cu=223) of 30% MAO solution in toluene and 0.0102 g (FW 428, 0.0238 mmol) of ($^i$Bu$_2$NCS$_2$)CuBr$_2$. Then 5 g of t-butyl acrylate was added. The Parr reactor was then sealed, placed in a fume hood and pressurized with 5 MPa (700 psig) ethylene and stirred at 60° C. for 24 hours. The reactor was cooled, vented and its contents poured into a solution of MeOH/HCl (300 mL MeOH/100 mL 10% HCl). The mixture was stirred for 24 hours to remove catalyst residues. The polymer was isolated by filtration and dried under vacuum at 60° C. for 24 hours. The yield of the polymer was 610 mg. $^{13}$C NMR spectrum of the product showed that the composition of the copolymer was 51 mole % ethylene (E) and 49 mole % acrylate (A). Copolymer sequence distribution has been studied by $^{13}$C-NMR. The methine carbons of the acrylate are present in three distinct clusters at 46.5 ppm (EAE), 44.2 ppm (EAA, AAE) and 42.2 ppm (AAA). The assignment of the triad sequences is consistent with the published literature. (E. F. McCord, et al., *Macromolecules*, 1997, 30, 246; J. C. Randall, et al., *Macromolecules*, 1992, 25, 2624; M. D. Bruch, et al., *Macromolecules*, 1986, 19, 2712). The distribution of triads for EAE:EAA/AAE:AAA was 15:27:58%, respectively, suggesting that these are true copolymers. GPC of the copolymer showed a unimodal peak ($M_W$=22,930; PDI=2.5) by DRI and UV (215 nm) GPC detectors. The superimposability of the two types of curves obtained by different detectors indicates a uniform distribution of the acrylate.

Example 5
Copolymerization of Ethylene and t-butyl Acrylate Using ($^i$Bu$_2$NCS$_2$)CuBr$_2$ of Example 1

A glass-lined Parr reactor was loaded in an argon glove-box with 100 mL of toluene, 1.0158 g (5.25 mmol, Al/Cu= 2000) of 30% MAO solution in toluene and 0.00112 g (FW 428, 0.0027 mmol) of($^i$Bu$_2$NCS$_2$)CuBr$_2$. Then 2.03 g of t-butyl acrylate was added. The Parr reactor was then sealed, placed in a fume hood and pressurized with 5 MPa (700 psig) ethylene and stirred at 60° C. for 24 hours. The reactor was cooled, vented and its contents poured into a solution of MeOH/HCl (300 mL MeOH/100 mL 10% HCl). The mixture was stirred for 24 hours to remove catalyst residues. The polymer was isolated by filtration and dried under vacuum at 60° C. for 24 hours. The yield of the polymer was 56 mg. $^{13}$C NMR spectrum of the product showed that the composition of the copolymer was 61 mole % ethylene and 39 mole % acrylate. Copolymer sequence distribution has been studied by $^{13}$C—NMR. The methine carbons of the acrylate are present in three distinct clusters at 46.5 ppm (EAE), 44.2 ppm (EAA, AAE) and 42.2 ppm (AAA). The distribution of triads for EAE:EAA/AAE:AAA was 37:48:16%, respectively, suggesting that these are true copolymers.

Example 6
Preparation of ($^i$Bu$_2$NCS$_2$)AuBr$_2$

The compound was made following a modified literature procedure (H. J. Blaauw, et al., *J. Organometal. Chem.*, 1964, 2, 236–244). A solution of 0.394 g of HAuCl$_4$.3H$_2$O (1 mmole) in 50 mL of saturated NaCl solution under N$_2$ was cooled to 0° C. and reduced with 0.126 g of Na$_2$SO$_3$. To this solution 0.114 g (0.5 mmole) of Na(S$_2$CN$^i$Bu$_2$) was added with stirring. Solid {[Au(S$_2$CN$^i$Bu$_2$)]n} began to precipitate with stirring over 1 hour. The solid was extracted from the aqueous mixture with chloroform and separated, and then chloroform was removed in vacuo. The residue was extracted with 50 mL of CH$_2$Cl$_2$, and a mixture of 0.1598 g of Br$_2$ in 1.6 mL of CH$_2$Cl$_2$ was added. The yellow solution became deep violet, then red. The solution was stirred under N$_2$ for 30 minutes, with some crystals forming from the solution. The volume of the solution was reduced and left at −20° C. for 2 hours. The reddish-orange crystals were isolated and re-crystallized from CH$_2$Cl$_2$/Et$_2$O at −20° C., and the yield=0.45 g (80%). $^1$H NMR (CDCl$_3$, 300 MHz): δ (ppm) 0.99 (d, J$_{H-H}$=6.9 Hz, 12H), 2.23 (m, 2H), 3.42 (d, J$_{H-H}$=7.5 Hz, 4H).

Example 7
Polymerization of Ethylene Using ($^i$Bu$_2$NCS$_2$)AuBr$_2$ of Example 6

A glass lined-Parr reactor was loaded in an argon glove-box with 100 mL of toluene, 6.9364 g (0.035 mol, Al/Au= 1000) of 30% MAO solution in toluene and 0.0206 g (FW 561, 0.04 mmol) of ($^i$Bu$_2$NCS$_2$)AuBr$_2$, the compound formed in Example 6. The Parr reactor was then sealed, placed in a fume hood and pressurized with 5 MPa (700 psig) ethylene and stirred at 60° C. for 24 hours. The reactor was cooled, vented and its contents poured into a solution of MeOH/HCl (300 mL MeOH/100 mL 10% HCl). The mixture was stirred for 24 hours to remove catalyst residues. The polymer was isolated by filtration and dried under vacuum at 60° C. for 24 hours. The yield of the polyethylene was 50 mg. The IR spectrum (film) of the product showed the characteristic linear crystalline polyethylene doublet absorption at 719 and 729 cm$^{-1}$. The $^1$H NMR spectrum of the product was examined to quantify the number of methyl branches. The sample was prepared in 1,1,2,2-tetrachloroethane-d$_2$, with chromium acetylacetonate (Cr (acac)3) added to the carbon sample as a relaxation agent. The $^1$H NMR spectrum of the product showed resonances at: d 1.34(—CH$_2$—), 0.93(—CH$_2$—), 5.97(vinyl). The integration of the resonances suggests that there were 0.7 vinyl and 4.4 methyl per 1000 C atoms.

Example 8
Copolymerization of Ethylene and t-butyl Acrylate Using ($^i$Bu$_2$NCS$_2$)AuBr$_2$ of Example 6

A glass-lined Parr reactor was loaded in an argon glove-box with 100 mL of toluene, 1.5167 g (0.0078 mol, Al/Au= 220) of 30% MAO solution in toluene and 0.020 g (FW 561, 0.036 mmol) of ($^i$Bu$_2$NCS$_2$)AuBr$_2$. Then 5.32 g of t-butyl acrylate was added. The Parr reactor was then sealed, placed in a fume hood and pressurized with 5 MPa (700 psig) ethylene and stirred at 60° C. for 24 hours. The reactor was cooled, vented and its contents poured into a solution of MeOH/HCl (300 mL MeOH/100 mL 10% HCl). The mixture was stirred for 24 hours to remove catalyst residues. The polymer was isolated by filtration and dried under vacuum at 60° C. for 24 hours. The yield of the polymer was 110 mg. $^{13}$C NMR spectrum of the product showed that the composition of the copolymer was 36 mole % ethylene and 64 mole % acrylate. Copolymer sequence distribution was studied using $^{13}$C-NMR. The methine carbons of the acrylate are present in three distinct clusters at 46.5 ppm (EAE), 44.2 ppm (EAA, AAE) and 42.2 ppm (AAA). The distribution of triads for EAE:EAA/AAE:AAA was 13:46:41%, respectively, suggested that these are true copolymers.

Example 9
Preparation of ($^i$Bu$_2$NCS$_2$)Au[S$_2$C$_2$(CN)$_2$]

The compound was prepared by a ligand exchange reaction. A solution of 0.4 g (0.71 mmol) of complex ($^i$Bu$_2$NCS$_2$)AuBr$_2$ dissolved in 11 mL of CH$_2$Cl$_2$ was slowly added under N$_2$ to a Schlenk flask containing a suspension of 0.14 g (0.75 mmol) of Na$_2$S$_2$C$_2$(CN)$_2$ (re-crystallized from EtOH/Et2O) in 11 mL of CH$_2$Cl$_2$. The suspension was stirred under N$_2$ overnight and filtered. The volume of the filtrate was reduced by one-half, and an equal amount of Et$_2$O was added. The solution then turned cloudy. The mixture was cooled to −20° C. for 4 hours and filtered cold. The dark solid was re-crystallized from CH$_2$Cl$_2$/MeCN (1:1). $^1$H NMR (CDCl$_3$, 500 MHz): δ (ppm) 1.0 (d, 12H, J$_{H-H}$=6.5 Hz), 2.29 (m, 2H), 3.52 (d, 4H, J$_{H-H}$=7.5 Hz).

Example 10
Polymerization of Ethylene Using ($^i$Bu$_2$NCS$_2$)Au[S$_2$C$_2$(CN)$_2$] of Example 9

A glass-lined Parr reactor was loaded in an argon glove-box with 100 mL of toluene, 7.228 g (0.037 mol, Al/Au= 1000) of 30% MAO solution in toluene and 0.0200 g (FW 541, 0.036 mmol) of ($^{t}Bu_2NCS_2$)Au[$S_2C_2(CN)_2$], the compound formed in Example 9. The Parr reactor was then sealed, placed in a fume hood and pressurized with 5 MPa (700 psig) ethylene and stirred at 60° C. for 24 hours. The reactor was cooled, vented and its contents poured into a solution of MeOH/HCl (300 mL MeOH/100 mL 10% HCl). The mixture was stirred for 24 hours to remove catalyst residues. The polymer was isolated by filtration and dried under vacuum at 60° C. for 24 hours. The yield of the polyethylene was 55 mg. The IR spectrum (film) of the product showed the characteristic linear crystalline polyethylene doublet absorption at 719 and 729 cm$^{-1}$. The $^1$H NMR spectrum of the product was examined to quantify the number of methyl branches. The sample was prepared in 1,1,2,2-tetrachloroethane-d2, with chromium acetylacetonate (Cr(acac)$_3$) added to the carbon sample as a relaxation agent. The $^1$H NMR spectrum of the product showed resonances at: d 1.34(—CH$_2$—), 0.93(—CH$_2$), 5.97(vinyl). The integration of the resonances suggests that there were 0.9 vinyl and 41.5 methyl per 1000 carbon atoms.

Example 11
Preparation of ($^{t}Bu_2NCS_2$)Cu[$S_2C_2(CN)_2$]

The compound was prepared by a ligand exchange reaction. A solution of 0.535 g (1.25 mmol) of complex ($^{t}Bu_2NCS_2$)CuBr$_2$ dissolved in 7.5 mL of CH$_2$Cl$_2$ was slowly added under N$_2$ to a Schlenk flask containing a suspension of 0.233 g (1.25 mmol) of Na$_2$S$_2$C$_2$(CN)$_2$ (recrystallized from EtOH/Et$_2$O) in 12.5 mL of CH$_2$Cl$_2$. The suspension was stirred under N$_2$ for 1 hour and filtered. Et$_2$O was added to the filtrate until the solution turned cloudy. The mixture was cooled to $-20°$ C. overnight. Dark crystals formed in the solution and were washed with Et$_2$O and dried under vacuum (yield 0.33 g, 65%). $^1$H NMR (CDCl$_3$, 400 MHz): δ (ppm) 1.0 (d, 12H, $J_{H-H}$=6.5 Hz), 2.25 (m, 2H), 3.6 (d, 4H, $J_{H-H}$=7.5 Hz).

Example 12
Preparation of Cu(bidhp)Cl$_2$

The ligand 1,7-bis(5-methyl-4-imidazolyl)-2,6-dithioheptane (bidhp) was first prepared in its hydrochloride form (bidhp.2HCl) following a literature method by refluxing 4-hydroxymethyl-5-methylimidazole hydrochloride with propane-1,3-dithiol in acetic acid (J. van Rijn, et al., *Inorg. Chem.*, 1984, 23, 3584). The hydrochloride form was then neutralized with a base to form bidhp. Toward a solution of bidhp (0.37 g, 1 mmol) in 40 mL absolute ethanol was added a solution of CuCl$_2$.2H$_2$O (0.17 g, 1 mmol) in 20 mL ethanol and stirred. The mixture was heated slightly and turned cloudy in about 30 minutes, and some greenish-yellow precipitate formed. The precipitate was filtered, washed with Et$_2$O and dried under vacuum, yielding 0.40 g (90%) of Cu(bidhp)Cl$_2$. Elemental analysis shows: Cu, 14.3% (found), 14.8% (calculated); C, 34.9% (found), 36.2 (calculated); H, 4.4% (found), 4.6% (calculated); N, 11.7% (found), 13% (calculated). FAB/MS: m/z 430 [(M-1)$^+$].

Example 13
Polymerization of Ethylene Using Cu(bidhp)Cl$_2$ of Example 12

A glass-lined Parr reactor was loaded in an argon glove-box with 100 mL of toluene, 9 g (0.0465 mol, Al/Cu=1000) of 30% MAO solution in toluene, and 0.02 g (FW 431, 0.0464 mmol) of Cu(bidhp)Cl$_2$, the compound formed in Example 12. The Parr reactor was then sealed, placed in a fume hood and pressurized with 5 MPa (700 psig) ethylene and stirred at 60° C. for 24 hours. The reactor was cooled, vented and its contents poured into a solution of MeOH/HCl (300 mL MeOH/100 mL 10% HCl). The mixture was stirred for 24 hours to remove catalyst residues. The polymer was isolated by filtration and dried under vacuum at 60° C. for 24 hours. The yield of the polyethylene was 100 mg. $^{13}$C NMR (TCE, Cr(AcAc)$_3$ δ29.5 (s, —CH$_2$—)). There were no detectable resonances for branching elsewhere in the spectrum (branch content<0.5 branches/1000 carbon atoms), using the method of Randall (*J. Macromol. Sci., Rev. Macromol. Chem. Phys.*, 1989, C29, 292). The IR spectrum (film) of the product showed the characteristic linear crystalline polyethylene doublet absorption at 719 and 729 cm$^{-1}$.

Example 14
Polymerization of n-butyl Acrylate Using Cu(bidhp)Cl$_2$ of Example 12

In an argon glove-box, a 30 mL septum bottle was loaded with 0.0140 g (FW 431, 0.0324 mmol) of Cu(bidhp)Cl$_2$ and 15 mL of toluene. An amount of 0.77 g (0.004 mol, Al/Cu=123) of 30% MAO solution in toluene was then added. Then, 5 g (FW 128.17, 0.039 mol) of n-butyl acrylate was added. The bottle was sealed in the glove box and brought into the fume hood. The solution was stirred at 25° C. for 24 hours. The viscous solution was poured into methanol/10% HCl (300:100) solution to precipitate the polymer. The product was washed with water, then methanol, and dried in vacuum oven at 60° C. for 24 hours. The yield of the poly(n-butyl acrylate) was 2.90 g (58%). The IR (film) spectrum of the product showed the ester carbonyl band at 1726 cm$^{-1}$. $^{13}$C NMR (ppm, TCE, Cr(AcAc)$_3$:13.7 [s, —CH$_2$—CH(COOCH$_2$CH$_2$CH$_2$CH$_3$)—], 19.1 [s, —CH$_2$—CH (COOCH$_2$CH$_2$CH$_2$CH$_3$)—], 30.7 [s, —CH$_2$—CH(COOCH$_2$CH$_2$CH$_2$CH$_3$)—], 34–37 [m, —CH$_2$CH(COOCH$_2$CH$_2$ CH$_2$CH$_3$)—], 41–42 [m, —CH$_2$—CH(COOCH$_2$CH$_2$CH$_2$CH$_3$)—], 64.5 [s, —CH$_2$—CH(COOCCH$_2$CH$_2$CH$_2$CH$_3$)—], 174–175 [m, —CH$_2$—CH(COOCH$_2$CH$_2$CH$_2$CH$_3$)—]. There were no resonances due to olefin from the monomer.

Example 15
Copolymerization of Ethylene and t-butyl Acrylate Using Cu(bidhp)Cl$_2$ of Example 12

A glass-lined Parr reactor was loaded in an argon glove-box with 100 mL of toluene, 1.0089 g (5.22 mmol, Al/Cu=203) of 30% MAO solution in toluene and 0.0111 g (FW 431.2, 0.0464 mmol) of Cu(bidhp)Cl$_2$. Then 5 g of t-butyl acrylate was added. The Parr reactor was then sealed, placed in a fume hood and pressurized with 5 MPa (700 psig) ethylene and stirred at 60° C. for 24 hours. The reactor was cooled, vented and its contents poured into a solution of MeOH/HCl (300 mL MeOH/100 mL 10% HCl). The mixture was stirred for 24 hours to remove catalyst residues. The polymer was isolated by filtration and dried under vacuum at 60° C. for 24 hours. The yield of the polyethylene was 370 mg. The $^{13}$C NMR spectrum of the product showed peaks due to both ethylene, as well as t-butyl acrylate. Integration of the peak indicates a copolymer composition of 37 mole % ethylene and 63 mole % t-butyl acrylate. Copolymer sequence distribution has been studied by $^{13}$C-NMR. The methine carbons of the acrylate are present in three distinct clusters at 46.5 ppm (EAE), 44.2 ppm (EAA, AAE) and 42.2 ppm (AAA). The assignment of the triad sequences is consistent with the published literature. (E. F. McCord, et al., *Macromolecules*, 1997, 30, 246; J. C. Randall, et al., *Macromolecules*, 1992, 25, 2624; M. D. Bruch, et al., *Macromolecules*, 1986, 19, 2712). The distribution of triads for EAE:EAA/AAE:AAA was 20:44:36%, respectively, suggested that these are true copolymers. GPC of the copolymer showed a unimodal peak ($M_W$=29,890; PDI=2.6) by DRI and UV (215 nm) GPC detectors. The superimposability of the two types of curves obtained by different detectors indicates a uniform distribution of the acrylate monomer in the copolymer.

Example 16
Polymerization of t-butyl Acrylate Using Cu(bidhp)Cl$_2$ of Example 12

In an argon glove-box, a 30 mL septum bottle was loaded with 0.0110 g (FW 431, 0.0255 mmol) of Cu(bidhp)Cl$_2$ and 15 mL of toluene. An amount of 0.7818 g (0.004 mol, Al/Cu=158) of 30% MAO solution in toluene was then added. Then, 5 g (FW 128.17, 0.039 mol) of t-butyl acrylate was added. The bottle was sealed in the glove box and brought into the fume hood. The solution was stirred at 25° C. for 72 hours. The viscous solution was poured into methanol/10% HCl (300:100) solution to precipitate the polymer. The product was washed with water, then methanol, and dried in a vacuum oven at 60° C. for 24 hours. The yield of the poly(t-butyl acrylate) was 1.99 g (39.8%). The IR (film) spectrum of the product showed the ester carbonyl band at 1726 cm$^{-1}$.

Example 17
Preparation of Cu(bidhx)Cl$_2$

The ligand 1,6-bis(5-methyl-4-imidazolyl)-2,5-dithiohexane (bidhx) was prepared following a literature method by refluxing 4-hydroxymethyl-5-methylimidazole hydrochloride with ethanedithiol in acetic acid (E. Bouwman, et al., *Synth. Commun.*, 1988, 18, 1581). Toward a hot solution of bidhx (2.0 g, 7.1 mmol) in 50 mL absolute ethanol was added a solution of CuCl$_2$.2H$_2$O (1.33 g, 7.8 mmol) in 30 mL ethanol and the mixture was stirred (J. van Rijn, et al., *Polyhedron*, 1989, 8, 1965). The mixture turned cloudy and a green precipitate formed. The precipitate was filtered, washed with Et$_2$O, and dried under vacuum, yielding 2.24 g (76%) of Cu(bidhx)Cl$_2$. Elemental analysis: C, 33.45% (found), 34.5 (calculated); H, 4.26% (found), 4.3% (calculated); N, 12.34% (found), 13.4% (calculated).

Example 18
Polymerization of t-butyl Acrylate Using Cu(bidhx)Cl$_2$ of Example 17

In an argon glove-box, a 30 mL septum bottle was loaded with 0.0101 g (FW 417, 0.0242 mmol) of Cu(bidhx)Cl$_2$, the compound formed in Example 17. An amount of 0.7823 g (0.004 mol, Al/Cu=167) of 30% MAO solution in toluene was then added. Then, 5 g (FW 128.17, 0.039 mol) of t-butyl acrylate was added. The bottle was sealed in the glove box and brought into the fume hood. The solution was stirred at 25° C. for 72 hours. The viscous solution was poured into methanol/10% HCl (300:100) solution to precipitate the polymer. The product was washed with water, then methanol, and dried in vacuum oven at 60° C. for 24 hours. The yield of the poly(t-butyl acrylate) was 1.84 g (36.8%). The IR (film) spectrum of the product showed the ester carbonyl band at 1726 cm$^{-1}$.

Example 19
Preparation of Mn(bidhp)Cl$_2$

The bidhp ligand was prepared as in Example 12. A similar procedure as used in Example 17 was used to prepare Mn(bidhp)Cl$_2$. An amount of 1.0 g (3.4 mmol) of bidhp was mixed with 0.51 g (4.05 mmol) of MnCl$_2$ in hot ethanol, and the white precipitate was collected, yielding 1.01 g (70%) of Mn(bidhp)Cl$_2$. Elemental analysis: C, 37.27% (found), 36.97% (calculated); H, 4.99% (found), 4.74% (calculated); N, 12.63% (found), 13.27% (calculated).

Example 20
Polymerization of t-butyl Acrylate Using Mn(bidhp)Cl$_2$ of Example 19

In an argon glove-box, a 30 mL septum bottle was loaded with 0.0105 g (FW 422, 0.0249 mmol) of Mn(bidhp)Cl$_2$, the compound formed in Example 19, and 15 mL of toluene. An amount of 0.7788 g (0.004 mol, Al/Mn=162) of 30% MAO solution in toluene was then added. Then, 5 g (FW 128.17, 0.039 mol) of t-butyl acrylate was added. The bottle was sealed in the glove box and brought into the fume hood. The solution was stirred at 25° C. for 72 hours. The viscous solution was poured into methanol/10% HCl (300:100) solution to precipitate the polymer. The product was washed with water, then methanol, and dried in vacuum oven at 60° C. for 24 hours. The yield of the poly(t-butyl acrylate) was 1.05 g (21%). The IR (film) spectrum of the product showed the ester carbonyl band at 1726 cm$^{-1}$.

The invention having been thus described, it will be obvious that the same may be varied in many ways without departing from the spirit and scope of the invention as defined by the following claims.

What is claimed is:

1. A catalyst system comprising:
   (a) a complex having a formula LML', wherein
      L is a chelating ligand containing sulfur donors,
      M is a transition metal selected from the group consisting of copper, silver, gold, manganese, iron, cobalt, palladium and nickel, and
      L' is a bidentate ligand selected from the group consisting of dithiolene, dithiolate, diphosphine, bisimine, bispyridine, phenanthroline, oxolate, catecholate, thiolatoamide, thiolatoimine, and thiolatophosphine; and
   (b) an activating cocatalyst.

2. A catalyst system comprising:
   (a) a complex having a formula selected from the group consisting of LMX$_1$X$_2$ and LML', wherein
      L has the formula R$_n$ZCS$_2$, wherein R is selected from the group consisting of hydrogen, alkyl, substituted alkyl, alkenyl, substituted alkenyl, aryl, substituted aryl, alkoxyl, substituted alkoxyl, cycloalkyl, substituted cycloalkyl, amino and substituted amino groups, n=1 or 2 and Z is nitrogen or oxygen,
      M is a transition metal selected from the group consisting of copper, silver, gold, manganese, iron, cobalt, palladium and nickel,
      X$_1$ and X$_2$ are independently selected from the group consisting of halides, hydride, triflate, acetate, borate, alkyl, alkoxyl, cycloalkyl, cycloalkoxyl, aryl, thiolate, carbon monoxide, cyanate and olefins, and
      L' is a bidentate ligand selected from the group consisting of dithiolene, dithiolate, diphosphine, bisimine, bispyridine, phenanthroline, oxolate, catecholate, thiolatoamide, thiolatoimine, and thiolatophosphine; and
   (b) an activating cocatalyst.

3. The catalyst system of claim 2 wherein when Z is oxygen, n=1.

4. The catalyst system of claim 2 wherein when Z is nitrogen, n=2.

5. The catalyst system of claim 4 wherein L is $^i\text{Bu}_2\text{NCS}_2$.

6. A catalyst system comprising:
(a) a complex having a formula selected from the group consisting of $\text{LMX}_1\text{X}_2$ and LML', wherein
L comprises a bisimidazolyl dithioalkane ligand having the structure:

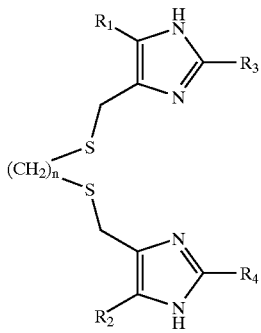

wherein $R_1$, $R_2$, $R_3$ and $R_4$ are independently selected from hydrogen, alkyl, substituted alkyl, alkenyl, substituted alkenyl, aryl, substituted aryl, alkoxyl, substituted alkoxyl, cycloalkyl, substituted cycloalkyl, amino, and substituted amino group, and n=1 to 6,
M is a transition metal selected from the group consisting of copper, silver, gold, manganese, iron, cobalt, palladium and nickel,
$X_1$ and $X_2$ are independently selected from the group consisting of halides, hydride, triflate, acetate, borate, alkyl, alkoxyl, cycloalkyl, cycloalkoxyl, aryl, thiolate, carbon monoxide, cyanate and olefins, and
L' is a bidentate ligand selected from the group consisting of dithiolene, dithiolate, diphosphine, bisimine, bispyridine, phenanthroline, oxalate, catecholate, thiolatoamide, thiolatoimine, and thiolatophosphine; and
(b) an activating cocatalyst.

7. The catalyst system of claim 6 wherein L is selected from the group consisting of 1,7-bis(5-methyl-4-imidazolyl)-2,6-dithioheptane (bidhp) and 1,6-bis(5-methyl-4-imidazolyl)-2,5-dithiohexane (bidhx).

8. The catalyst system of claim 1 wherein L' is $\text{S}_2\text{C}_2(\text{CN})_2$.

9. The catalyst system of claim 2 or claim 6 wherein $X_1 = X_2$ and are selected from the group consisting of bromine and chlorine.

10. The catalyst system of claim 1, claim 2 or claim 6 wherein the cocatalyst is selected from the group consisting of alkylaluminoxanes, aluminum alkyls, aluminum halides, alkyl aluminum halides, Lewis acids, alkylating agents and mixtures thereof.

11. The catalyst system of claim 10 wherein the cocatalyst comprises methylaluminoxane.

12. The catalyst system of claim 1, claim 2 or claim 6 wherein the ratio of the complex to the activating cocatalyst is from $1:10^{-2}$ to $1:10^6$.

13. The catalyst system of claim 12 wherein the ratio of the complex to the activating cocatalyst is from 1:0.5 to $1:10^4$.

14. The catalyst system of claim 13 wherein the ratio of the complex to the activating cocatalyst is from 1:0.75 to $1:10^3$.

15. A method for polymerizing olefinic monomers selected from the group consisting of: (A) acyclic aliphatic olefins, (B) olefins having a hydrocarbyl polar functionality, and (C) mixtures of (i) at least one olefin having a hydrocarbyl polar functionality and (ii) at least one acyclic aliphatic olefin, the method comprising contacting the olefinic monomer or monomers under polymerization conditions with a catalyst system comprising:
(a) a complex having a formula LML', wherein
L is a chelating ligand containing sulfur donors,
M is a transition metal selected from the group consisting of copper, silver, gold, manganese, iron, cobalt, palladium and nickel, and
L' is a bidentate ligand selected from the group consisting of dithiolene, dithiolate, diphosphine, bisimine, bispyridine, phenanthroline, oxalate, catecholate, thiolatoamide, thiolatoimine, and thiolatophosphine; and
(b) an activating cocatalyst.

16. A method for polymerizing olefinic monomers selected from the group consisting of: (A) acyclic aliphatic olefins, (B) olefins having a hydrocarbyl polar functionality, and (C) mixtures of (i) at least one olefin having a hydrocarbyl polar functionality and (ii) at least one acyclic aliphatic olefin, the method comprising contacting the olefinic monomer or monomers under polymerization conditions with a catalyst system comprising:
(a) a complex having a formula selected from the group consisting of $\text{LMX}_1\text{X}_2$ and LML', wherein
L has the formula $R_n\text{ZCS}_2$, wherein R is selected from the group consisting of hydrogen, alkyl, substituted alkyl, alkenyl, substituted alkenyl, aryl, substituted aryl, alkoxyl, substituted alkoxyl, cycloalkyl, substituted cycloalkyl, amino and substituted amino group, n=1 or 2, and Z is nitrogen or oxygen,
M is a transition metal selected from the group consisting of copper, silver, gold, manganese, iron, cobalt, palladium and nickel,
$X_1$ and $X_2$ are independently selected from the group consisting of halides, hydride, triflate, acetate, borate, alkyl, alkoxyl, cycloalkyl, cycloalkoxyl, aryl, thiolate, carbon monoxide, cyanate and olefins, and
L' is a bidentate ligand selected from the group consisting of dithiolene, dithiolate, diphosphine, bisimine, bispyridine, phenanthroline, oxalate, catecholate, thiolatoamide, thiolatoimine, and thiolatophosphine; and
(b) an activating cocatalyst.

17. The method of claim 16 wherein when Z is oxygen, n=1.

18. The method of claim 16 wherein when Z is nitrogen, n=2.

19. The method of claim 18 wherein L is $^i\text{Bu}_2\text{NCS}_2$.

20. A method for polymerizing olefinic monomers selected from the group consisting of: (A) acyclic aliphatic olefins, (B) olefins having a hydrocarbyl polar functionality, and (C) mixtures of (i) at least one olefin having a hydrocarbyl polar functionality and (ii) at least one acyclic aliphatic olefin, the method comprising contacting the olefinic monomer or monomers under polymerization conditions with a catalyst system comprising:
(a) a complex having a formula selected from the group consisting of $\text{LMX}_1\text{X}_2$ and LML', wherein
L comprises a bisimidazolyl dithioalkane ligand having the structure:

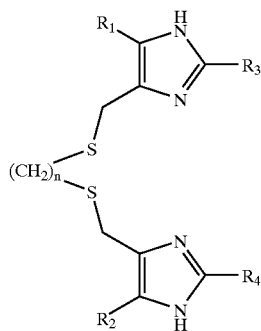

wherein $R_1$, $R_2$, $R_3$ and $R_4$ are independently selected from hydrogen, alkyl, substituted alkyl, alkenyl, substituted alkenyl, aryl, substituted aryl, alkoxyl, substituted alkoxyl, cycloalkyl, substituted cycloalkyl, amino, and substituted amino groups and n=1 to 6, M is a transition metal selected from the group consisting of copper, silver, gold, manganese, iron, cobalt, palladium and nickel, $X_1$ and $X_2$ are independently selected from the group consisting of halides, hydride, triflate, acetate, borate, alkyl, alkoxyl, cycloalkyl, cycloalkoxyl, aryl, thiolate, carbon monoxide, cyanate and olefins, and L' is a bidentate ligand selected from the group consisting of dithiolene, dithiolate, diphosphine, bisimine, bispyridine, phenanthroline, oxolate, catecholate, thiolatoamide, thiolatoimine, and thiolatophosphine; and (b) an activating cocatalyst.

21. The method of claim 20 wherein L is selected from the group consisting of 1,7-bis(5-methyl-4-imidazolyl)-2,6-dithioheptane (bidhp) and 1,6-bis(5-methyl-4-imidazolyl)-2,5dithiohexane (bidhx).

22. The method of claim 15 wherein L' is $S_2C_2(CN)_2$.

23. The method of claim 16 or claim 20 wherein $X_1=X_2$ and are selected from the group consisting of bromine and chlorine.

24. The method of claim 15, claim 16 or claim 20 wherein the cocatalyst is selected from the group consisting of alkylaluminoxanes, aluminum alkyls, aluminum halides, alkyl aluminum halides, Lewis acids other than any of the foregoing, alkylating agents and mixtures thereof.

25. The method of claim 24 wherein the cocatalyst comprises methylaluminoxane.

26. The method of claim 15, claim 16 or claim 20 wherein the ratio of the complex to the activating cocatalyst is from $1:10^{-2}$ to $1:10^6$.

27. The method of claim 26 wherein the ratio of the complex to the activating cocatalyst is from 1:0.5 to $1:10^4$.

28. The method of claim 27 wherein the ratio of the complex to the activating cocatalyst is from 1:0.75 to $1:10^3$.

29. The method of claim 15, claim 16 or claim 20 wherein the contacting is at a temperature in the range of from about −100° C. to about 250° C. and at pressures of from about 0.1 MPa to about 210 MPa.

30. The method of claim 15, or claim 16 or claim 20 wherein the contacting is conducted in a solvent.

31. The method of claim 30 wherein the solvent is selected from the group consisting of an aliphatic solvent, an aromatic hydrocarbon solvent, and a halogenated aromatic solvent.

32. The method of claim 31 wherein the solvent is toluene.

33. The method of claim 15, claim 16 or claim 20 wherein the catalyst system is supported.

34. The method of claim 33 wherein the catalyst system is supported on the group consisting of alumina materials, silica materials, mesoporous materials, and cross-linked polymers.

35. The method of claim 34 wherein the mesoporous materials comprises MCM-41.

36. The method of claim 15, claim 16 or claim 20 wherein the contacting is conducted in a gas phase.

37. The method of claim 15, claim 16 or claim 20 wherein the olefinic monomer is selected from the group consisting of ethylene, n-butyl acrylate and t-butyl acrylate.

* * * * *